United States Patent
Brückner et al.

(10) Patent No.: US 6,678,657 B1
(45) Date of Patent: Jan. 13, 2004

(54) METHOD AND APPARATUS FOR A ROBUST FEATURE EXTRACTION FOR SPEECH RECOGNITION

(75) Inventors: Raymond Brückner, Nürnberg (DE); Hans-Günter Hirsch, Herodlsberg (DE); Rainer Klisch, Nürnberg (DE); Volker Springer, Nürnberg (DE)

(73) Assignee: Telefonaktiebolaget LM Ericsson(Publ), Stockholm (SE)

( * ) Notice: Subject to any disclaimer, the term of this patent is extended or adjusted under 35 U.S.C. 154(b) by 480 days.

(21) Appl. No.: 09/694,617

(22) Filed: Oct. 23, 2000

(30) Foreign Application Priority Data

Oct. 29, 1999 (EP) .............................. 99203613

(51) Int. Cl.$^7$ ............................. G10L 15/02
(52) U.S. Cl. ................. 704/240; 704/265; 704/233; 704/234
(58) Field of Search ................ 704/231, 265, 704/226, 233, 234, 240

(56) References Cited

U.S. PATENT DOCUMENTS

| 4,752,956 A | * 6/1988 | Sluijter ........................ 704/219 |
| 4,897,878 A | * 1/1990 | Boll et al. .................... 704/233 |
| 5,455,888 A | * 10/1995 | Iyengar et al. .............. 704/208 |
| 5,668,927 A | * 9/1997 | Chan et al. .................. 704/240 |

OTHER PUBLICATIONS

Krembel, L., European Search Report, App. No. EP 99 20 3613, May 30, 2000, pp. 1–3.
Matsumoto, H. et al., "Smoothed Spectral Subtraction for a Frequency–Weighted HMM in Noisy Speech Recognition," Proceedings of the International Conference on Spoken Language Processing, XX,XX, Jan. 1, 1996, pp. 905–908.

Yoma, N.B., et al., "Weighted matching Algorithms and Reliability in Noise Cancelling by Spectral Subtraction" IEEE International Conference on Acoustics, Speech, and Signal Processing (ICASSP), US, Los Alamitos, IEEE Comp., Soc. Press, 1997, pp. 1171–1174.

Soon, I.Y., et al., "Improved Noise Suppression Filter Using Self–adaptive Estimator of Probability of Speech Absence," Signal Processing, NL, Amsterdam, vol. 75, No. 2, Jun. 1999, pp. 151–159.

Yang, R., et al., "Noise Compensation for Speech Recognition in Car Noise Environments," Proceedings of the International Conference on Acoustics, Speech, and Signal Processing (ICASSP), US, New York, IEEE, 1995, pp. 433–436.

* cited by examiner

Primary Examiner—Tãlivaldis Ivars Šmits
Assistant Examiner—Abul K. Azad
(74) Attorney, Agent, or Firm—Jenkens & Gilchrist, P.C.

(57) ABSTRACT

The present invention relates to a method and an apparatus for a robust feature extraction for speech recognition in a noisy environment, wherein the speech signal is segmented and is characterized by spectral components. The speech signal is splitted into a number of short term spectral components in L subbands, with L=1, 2, . . . and a noise spectrum from segments that only contain noise is estimated. Then a spectral subtraction of the estimated noise spectrum from the corresponding short term spectrum is performed and a probability for each short term spectrum component to contain noise is calculated. Finally these spectral component of each short-term spectrum, having a low probability to contain speech are interpolated in order to smooth those short-term, spectra that only contain noise. With the interpolation the spectral components containing noise are interpolated by reliable spectral speech components that could be found in the neighborhood.

17 Claims, 4 Drawing Sheets

METHOD AND APPARATUS FOR A ROBUST FEATURE EXTRACTION FOR SPEECH RECOGNITION

BACKGROUND OF THE INVENTION

1. Technical Field

The invention relates to a method and a means for performing a robust feature extraction for a speech recognition in a noisy environment.

2. Description of Related Art

In the area of speech recognition a major problem for an accurate recognition of speech occurs in case of a noisy environment. All possible different types of noise have influence on the speech recognition and may degrade a recognition accuracy drastically.

Especially in the area of mobile telephony or access systems that allow access after recognising a spoken password, speech recognition is becoming more and more important. Especially in these areas mentioned, out of the possible different types of noise, the most problematic ones are additive stationary or instationary background noise. Another type of noise degrading the recognition accuracy is the influence of frequency characteristics of a transmission channel if the speech to be recognised is transmitted via such a channel. Additive noise may consist of background noise in combination with noise generated on a transmission line.

Therefore it is known from the prior art to provide a so-called linear or non-linear spectral subtraction. Spectral subtraction is a noise suppression technique, which reduces the effects of additive noise to speech. It estimates the magnitude or power spectrum of clean speech by explicitly subtracting the noise magnitude or power spectrum from the noisy magnitude or power spectrum. Such a technique was developed for enhancing speech in various communication situations.

As spectral subtraction necessitates estimation of the noise during pauses, it is also supposed that noise characteristics change slowly, to guarantee that the noise estimation is still valid. The success of this method necessitates the availability of a robust endpoint or voice activation detector to separate speech from noise. However, a good speech and noise separation is a necessary condition but is difficult to achieve at low Signal-to-Noise Ratio (SNR).

In addition even if spectral subtraction is computationally efficient since the noise is estimated during speech pauses and even if this technique can be implemented as a pre-processing technique leaving the other processing stages unchanged, the performance of the spectral subtraction method is strongly dependant on the noise and how the noise is extracted. The problem associated with this is that even if the wide-band noise is reduced, some noise residual remains (Junqua et al; "Robustness in automatic speech recognition"; Kluwer Academic Publisher; 1996; Section 9.2 Speech Enhancement, pages 277 ff.)

Anyhow, even if with the above mentioned methods the speech recognition may be improved, for these approaches the estimation of the noise characteristics is crucial. As mentioned above, a speech to noise discrimination is needed to mark those segments of a speech signal that contains only noise. But such a discrimination can not be free of errors and is difficult to achieve. In addition to this when it is looked at segments of the speech signal which contain the superposing of speech and stationary noise, these segments can be described by the superposition of corresponding distribution functions for a spectral noise component and a spectral speech component. These distribution functions overlap depending on the SNR. The overlap is higher, the lower the SNR is. And therefore in this case it can not be decided whether short-term spectra contain speech in spectral regions where the spectral magnitude of the speech takes values of the same size or less size than the noise.

SUMMARY OF THE INVENTION

The present invention provides a method and an apparatus that overcomes the problems and that allows a more robust speech recognition in noisy environment.

It is advantageous according to the invention that a short term spectrum only containing noise is smoothed and in addition in case of noisy speech segments, unreliable spectral components are interpolated by so called reliable ones, therefore resulting in an improved speech recognition, or more explicitly in a robust feature extraction, supporting an improved speech recognition.

It is advantageous to perform the interpolation based on at least one spectral component of an adjacent short term spectrum and/or at least one in time preceding spectral component, as it could be expected that a so called unreliable speech component with a low probability to contain speech is smoothed.

An improved speech recognition is achieved with taking two adjacent spectral components and one proceeding in time.

A further advantage according to the present invention is to compare the calculated probability to a threshold in order to get a definition which spectral component has to be interpolated.

It is further advantageous to interpolate the spectral component on the basis of noiseless speech.

Two interpolations are performed resulting in an even better speech recognition.

It is advantageous according to the present invention to base the division YYY of the short-term spectra on a MEL frequency range as the MEL frequency range is based on the human ear.

Further it is advantageous to use the method for a speech recognition to control electronic devices, e.g. mobile phones, telephones or access system using speech to allow access or dialling etc.

BRIEF DESCRIPTION OF THE DRAWINGS

In the following the invention will be further described and supported by means of examples and by the figures. The following figures show.

DETAILED DESCRIPTION OF THE DRAWINGS

Figure 1:
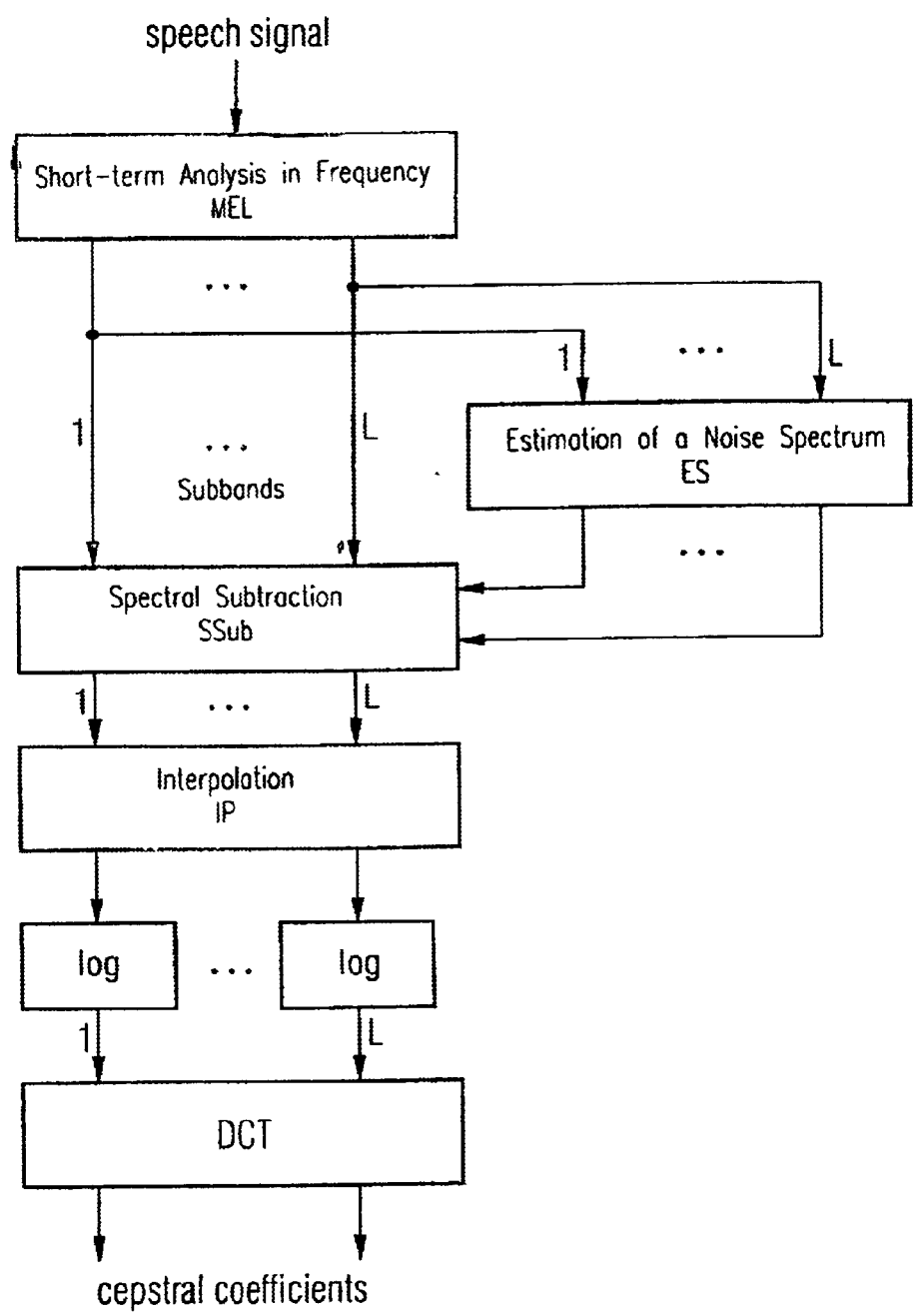
FIG. 1: Integration of an interpolation into a feature extraction according to the present invention.

To make a speech recognition more robust against noise, a robust feature extraction scheme can be applied. This scheme tries to extract those features out of the speech signal that are not sensitive to noise or which are freed from the influence of noise. Further to this the majority of feature extraction schemes are based on short-term spectral analysis. In addition most of the speech recognition systems are based on a short-term analysis in the MEL frequency range. The MEL frequency range is based on the human ear and is known in the prior art and therefore will not be further described in this application.

The term robust should cover robustness against stationary and instationary background noise as mentioned in the prior art. Further to this robustness as mentioned in the application should also cover robustness against unknown frequency characteristics resulting from any type of electronic device, e.g. a microphone and/or a digital or analogous filter by use of the invention for a mobile phone or any other telephone.

In the following the invention will be further described with the help of FIG. 1. A speech signal is, after a pre-processing e.g. framing and transformation that is not basis of this invention and that is well known in the prior art, splitted into a number of short term spectral components in L subbands, with L=1, 2, . . . L preferably is in the range of 10 to 30 MEL. The division into short-term spectral components may be based on a short-term spectral analysis in the MEL frequency range. The output of such a filterbank in the MEL frequency range is a short-term magnitude or power spectrum in the number of L subbands, with L=1, 2, . . .

In a next step an estimation of a noise spectrum from segments that only contain noise is performed ES. This can be done by applying a voice activity detector. The average spectrum is calculated from all spectra belonging to a segment which is marked as noise by a voice activity detector. The average spectrum is taken as the estimation of the noise spectrum.

Then a spectral subtraction is performed by subtracting the estimated noise spectrum from the noisy short-term spectrum Ssub and resulting in an estimation result. One realisation is the subtraction of the spectral components in the magnitude domain, being calculated as follows:

$$|S_l(t_i)|=|X_l(t_i)|-|N_l(t_i)| \quad (1)$$

with $|S_l|$=the estimation result of a spectral speech component, with $|X_l|$=the actual noisy input component, and $|N_l|$=the estimated noise component, at time=t and for the subband l=1, . . . , L.

It should be mentioned that in all equations the values as $S_l$, t etc should have the same meaning. In a further step, a probability for each short-term spectral component to contain noise is calculated. The calculation of the probability will be described in more detail later.

If the calculated probability for the short-term spectral component results in a low probability to contain speech, in a next step this spectral component is interpolated IP.

As in most of today's used speech recognition systems cepstral coefficients are used, the short-term spectra being smoothed and interpolated as described before may be further processed as follows. A logarithm of each short-term spectral component is taken log and finally a number of cepstral coefficients are transformed out of it via a discrete cosine transformation DCT.

In the following an interpolation of the spectral components of each short-term spectrum is described in more detail.

As described before the probability for a spectral component to contain speech is calculated. In case the probability calculation results in a low probability to contain speech the spectral component is considered to be unreliable. These unreliable components are then interpolated. This interpolation is for example based on looking at spectral components of at least one adjacent subband and/or at least one in time preceding or successive spectral component of the short-term spectrum.

As one preferred example two adjacent subbands and one in time preceding spectral component are taken for the interpolation.

The interpolation is for example done by calculating a weighted sum as follows:

$$|S_l(t_i)|=[prob_l(t_i) \times |S_l(t_i)|+prob_{l-1}(t_i) \times |S_{l-1}(t_i)|+prob_{l+1}(t_i) \times |S_{l+1}(t_i)|+prob_l(t_{i-1})|S_l(t_{i-1})|]/(\Sigma prob) \quad (2)$$

with prob=probability of a subband l.

Anyhow further spectral components of further adjacent subbands may be basis for the interpolation and therefore the description is not thought to limit to the scope of this.

Figure 4:
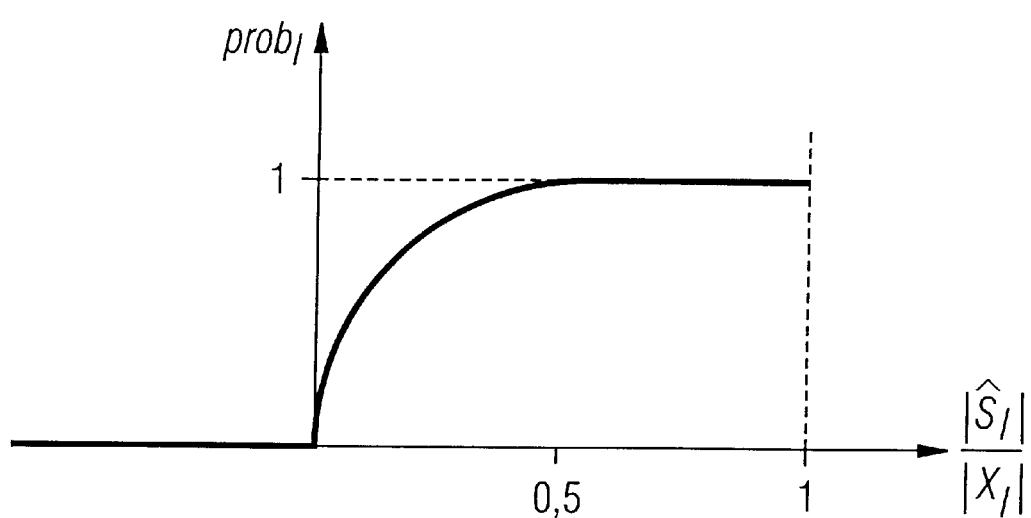
FIG. 4: Diagram of a probability function for the existence of speech.

As mentioned before the probability for each short-term spectrum to contain noise is calculated. Therefore a ratio between $|S_l(t_i)|/|X_{l(ti)}|$ is performed. This indirectly includes the signal-to-noise ratio in a short term spectrum at the time $t_i$. The ratio can take values between minus infinity and 1 as shown in FIG. 4 where the x-axis shows the ratio and the y-axis shows the probability prob. Negative values occur in case the noise component $|N_l(t_i)|$ is higher than the actual spectral component $X_l(t_i)$. This indicates noise and therefore further indicates an unreliable component. In comparison to this a value of 1 is taken if no noise is estimated and where pure speech is existent. FIG. 4 shows one example to define a measure for the probability that a spectral component contains speech.

As mentioned before an interpolation is done in case the calculated probability for the short term spectrum results in that the spectrum has a low probability to contain speech. As the calculated probability is not always either 0 or 1, preferably a threshold is defined to define spectral components with their correspondent ratio being below this threshold and therefore assuming to have a low probability to contain speech.

Preferably the threshold is 0.6 but can be any value between 0 and 1. The threshold may be predefined or changed depending on the environment.

In the following another example is described with the help of FIG. 2.

It should be mentioned here that blocks with the same index intend to have the same meaning throughout all figures.

In addition to the steps mentioned, a number M of spectral distances for each short term spectrum are determined. Said spectral distances are determined between the short term spectrum after subtraction and a number M of spectra containing noiseless speech, with M=1, 2, . . . Further for each short term spectrum at least one spectrum containing noiseless speech having the smallest spectral distance to said short term spectrum is determined MATCH.

The spectral distance can be calculated as follows:

$$Error(|S(t_i)|,|V(m)|)=\Sigma prob_l(t_i) \times (|S_l(t_i)|-|V_l(m)|)^2/\Sigma prob_l(t_i) \quad (3)$$

with V (m)=spectrum containing noiseless speech, and m being one of the codebook entries.

The one being calculated and having the smallest error is considered to be the one with the smallest spectral distance.

Following this the interpolation is performed by extracting spectral information from said noiseless speech spectra having the smallest spectral distance. Anyhow also a number of noiseless speech spectra can be taken all with a small spectral distance.

One possibility to perform the interpolation is to calculate a weighted sum of the actual estimated spectral component $|S_i(t_i)|$ and the corresponding component of the closest vector. This could be performed as follows:

$$|S_i(t_i)| = \text{prob}_i(t_i)|S_i(t_i)| + (1-\text{prob}_i(t_i)) \times V_i(m_{closest}) \quad (4)$$

The basic behind this is based on a knowledge that speech is only present at certain areas of a L dimensional spectral feature space. With this knowledge the interpolation of spectral components with a low probability to contain speech is based on the extraction of spectral information from the closest entry or more than one close entries in the codebook CB.

In the following another preferred embodiment of the invention is described by means of FIG. 3.

Figure 3:
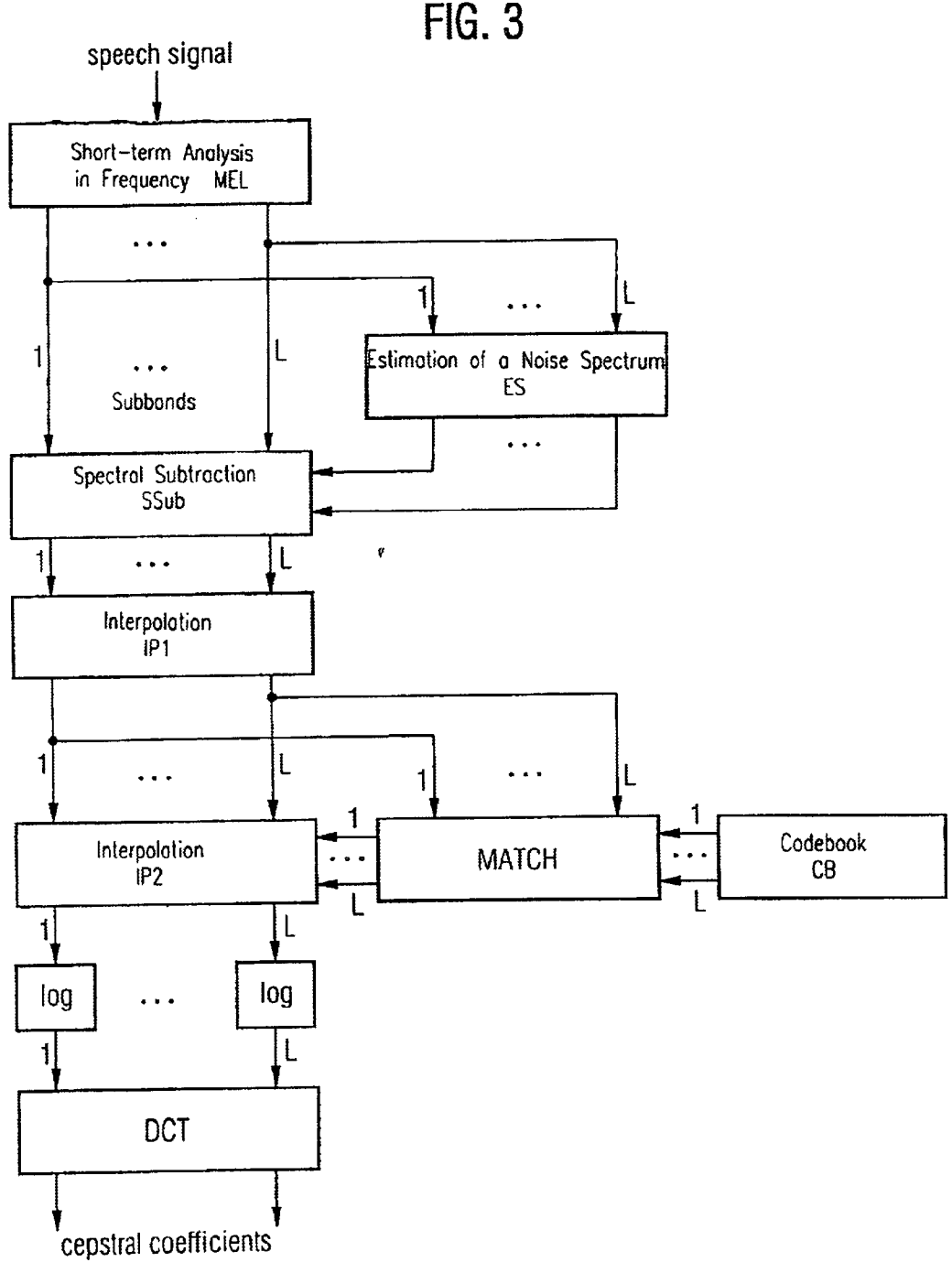
FIG. 3: Integration of an interpolation into a feature extraction according to the present invention.

As shown in FIG. 3 in addition to a first interpolation IP1 another interpolation IP2 is performed. In the example shown the first interpolation is based on spectral components of, at least one adjacent subband, and/or at least one in time preceding or successive spectral component of the short term spectrum as mentioned above in connection with FIG. 1.

Figure 2:
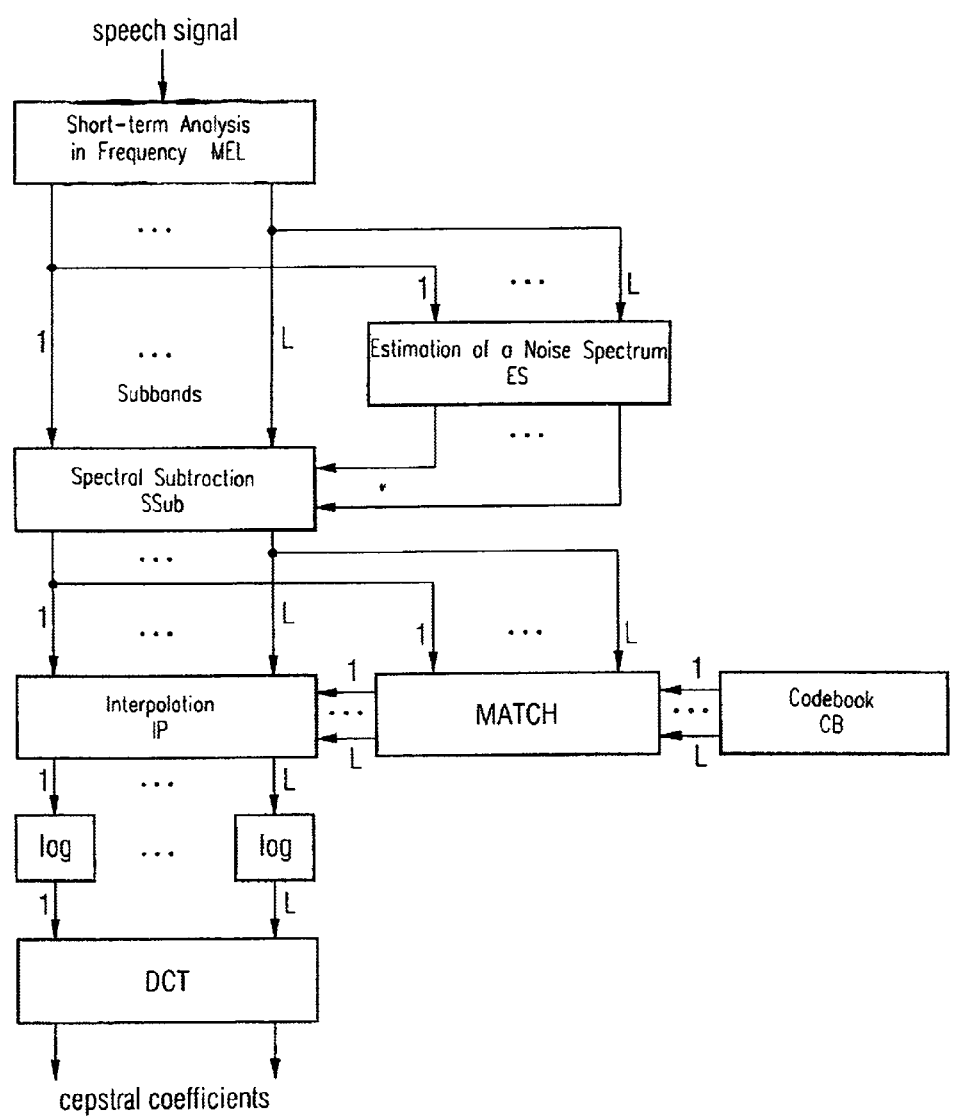
FIG. 2: Integration of an interpolation into a feature extraction according to the present invention.

The second interpolation IP2 is based on extracting spectral information from the noiseless speech spectra having the smallest spectral distance according to FIG. 2.

Anyhow this is not thought to restrict the invention as the interpolation IP2 could be performed first and then the interpolation IP1 can be performed. Anyhow it should be mentioned again that for both interpolations the essential aspect is that unreliable short term spectral components, or better said short term spectral components with a low probability to contain speech, are interpolated. In general the interpolation of the spectral components containing noise is based on reliable spectral speech components that could be found in the neighborhood as could be applied for both interpolations.

In the following an apparatus for a robust feature extraction for speech recognition in a noisy environment, wherein a speech signal is segmented and is characterized by spectral components are described according to FIG. 1. The apparatus comprises a filterbank MEL for splitting the speech signal into a number of spectral components in L subbands, with L=1, 2, . . . , Further estimation means ES for estimating a noise spectrum of segments that only contain noise are foreseen.

The apparatus further comprises a subtractor SSub for performing a spectral subtraction of the estimated noise spectrum from the corresponding short term spectrum and a calculator for calculating a probability for each short term spectrum to contain noise is foreseen.

Interpolation means IP for interpolating the spectral component of each short term spectrum, if the calculated probability to contain speech for the short term spectrum component are foreseen in the apparatus as well.

In another preferred embodiment of the application a comparator for comparing the calculated probability to a threshold defining the low probability to contain speech is provided.

Finally to get cepstral coefficients, means for taking a logarithm log of each spectral component and further means for performing a discrete cosines transformation DCT are foreseen and their output is a number of cepstral coefficients being used for the speech recognition.

In the following another preferred embodiment is described according to FIG. 2. It should be mentioned again that the same abbreviations should stay for the same block.

In addition to the means mentioned with FIG. 1, a codebook CB containing noiseless speech spectra, is foreseen and determining means for determining a number M of spectral distances for each short term spectrum, by determining said spectral distances between the short term spectrum after subtraction and a number M of spectra containing noiseless speech spectra are provided as well. Spectral information stored in the codebook comprises cepstral parameters.

Further to this determining means MATCH to determine for each short term spectrum at least one spectrum containing noiseless speech having the smallest spectral distance to said short term spectrum are foreseen and their result is an input for the interpolation means lpto perform the interpolation.

Finally a computer program product loadable into a memory of an electronic device should be described (without figure). A computer program product loadable into a memory, e.g. of a mobile phone should comprise software code portions or modules for performing the steps of the present invention.

Preferably this computer program is being stored on a computer readable medium.

Finally the method and apparatus and the computer program product could be used for a speech recognition to control electronic devices. Such an electronic device is for example a telephone or a mobile phone or an access means. Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for a robust feature extraction for speech recognition in a noisy environment, wherein a speech signal is segmented and is characterized by spectral components, said method comprising the steps of:

splitting the speech signal into a number of short term spectral components in L subbands, with L=1, 2 . . .

estimating a noise spectrum from segments that only contain noise;

performing a spectral subtraction of the estimated noise spectrum from a corresponding short term spectrum;

calculating a probability for each short term spectral component to contain noise; and interpolating the spectral component of each short-term spectrum, if the calculated probability to contain speech is low for the short-term spectral component.

2. The method according to claim 1, wherein said interpolating step comprises:

performing an interpolation based on spectral components of at least one adjacent subband, and at least one in time preceding or successive spectral component of the short-term spectrum, selectively.

3. The method according to claim 2, wherein said interpolating step further comprises: performing said interpolation based on two adjacent subbands and one in time preceding spectral component.

4. The method according to claim 1 comprising the additional step of:

comparing the calculated probability to a threshold defining the low probability to contain speech.

5. The method according to claim 1 comprising the additional steps of:

taking a logarithm of each spectral component, and performing a discrete cosine transformation (DCT).

6. The method according to claim 1, comprising the additional steps of:

determining a number M of spectral distances for each short term spectrum, by determining said spectral distances between the short term spectrum after subtraction and a number M of spectra containing noiseless speech; and determining for each short term spectrum at least one spectrum containing noiseless speech having the smallest spectral distance to said short term spectrum.

7. The method according to claim 6, wherein said interpolating step comprises:

extracting spectral information from said noiseless speech spectra having the smallest spectral distance.

8. The method according to claim 7 comprising the additional step of: calculating a weighted mean square error (MSE) to determine one of said spectral distances.

9. The method according to claim 7 comprising the additional step of:

storing spectral information comprising cepstral parameters in a codebook.

10. The method according to claim 6 wherein said interpolating step comprises first and second interpolations, and wherein:

said first interpolation comprises performing an interpolation based on spectral components of at least one adjacent subband and at least one in time preceding or successive spectral component of the short term spectrum, selectively; and said second interpolation comprises extracting spectral information from said noiseless speech having the smallest spectral distance.

11. The method according to claim 6 including the additional step of:

storing spectra containing noiseless speech in a codebook trained with noiseless speech.

12. The method according to claim 1 wherein speech into a number of subbands is based on a MEL frequency said splitting step comprises:

dividing said speech signal into a number of subbands based on a MEL frequency range.

13. Apparatus for a robust feature extraction for speech recognition in a noisy environment, wherein a speech signal is segmented and is characterized by spectral components, said apparatus comprising:

a filterbank (MEL) for splitting the speech signal into a number of spectral components in L subbands;

an estimation unit (ES) operable to estimate a noise spectrum of segments that only contain noise;

a subtractor (Ssub) for performing a spectral subtraction of the estimated noise spectrum from the corresponding short term spectrum;

a calculator for calculating a probability for each short term spectral component to contain noise; and an interpolation unit (IP) operable to estimate the spectral component of each short-term spectrum, if the calculated probability to contain speech is low for the short-term spectral component.

14. Apparatus according to claim 13, further comprising a comparator for comparing the calculated probability to a threshold defining the low probability to contain speech.

15. Apparatus according to claim 13 comprising a first calculating unit operable to take a logarithm of each spectral component and a second calculating unit operable to perform a discrete cosine transformation.

16. Apparatus according to claim 13 further comprising:

a codebook (CB) containing noiseless speech spectra;

a first device operable to determine a number M of spectral distances for each short term spectrum, by determining said spectral distances between the short term spectrum after subtraction and a number M of spectra containing noiseless speech spectra; and a second device operable to determine for each short term spectrum at least one spectrum containing noiseless speech having the smallest spectral distance to said short term spectrum.

17. Apparatus according to claim 13, wherein the filterbank comprises a MEL filterbank.

* * * * *

UNITED STATES PATENT AND TRADEMARK OFFICE
CERTIFICATE OF CORRECTION

PATENT NO. : 6,678,657 B1
DATED : January 13, 2004
INVENTOR(S) : Raymond Bruckner et al.

It is certified that error appears in the above-identified patent and that said Letters Patent is hereby corrected as shown below:

Column 7,
Line 40, delete "speech into a number of subbands is based on a MEL frequency"

Signed and Sealed this

Second Day of August, 2005

JON W. DUDAS
*Director of the United States Patent and Trademark Office*